(12) United States Patent
Pocovi et al.

(10) Patent No.: US 12,074,809 B2
(45) Date of Patent: Aug. 27, 2024

(54) SIGNALLING OF DEJITTERING BUFFER CAPABILITIES FOR TSN INTEGRATION

(71) Applicant: Nokia Technologies Oy, Espoo (FI)

(72) Inventors: Guillermo Pocovi, Aalborg (DK); Troels Kolding, Klarup (DK); Rakash Sivasivaganesan, Unterhaching (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/294,729

(22) PCT Filed: Nov. 19, 2018

(86) PCT No.: PCT/EP2018/081765
§ 371 (c)(1),
(2) Date: May 18, 2021

(87) PCT Pub. No.: WO2020/104005
PCT Pub. Date: May 28, 2020

(65) Prior Publication Data
US 2022/0014485 A1   Jan. 13, 2022

(51) Int. Cl.
*H04L 12/861*   (2013.01)
*H04L 49/90*    (2022.01)

(52) U.S. Cl.
CPC .................... *H04L 49/90* (2013.01)

(58) Field of Classification Search
CPC combination set(s) only.
See application file for complete search history.

(56) References Cited

U.S. PATENT DOCUMENTS

| | | | |
|---|---|---|---|
| 8,085,678 B2 | 12/2011 | Spindola et al. | |
| 2004/0165530 A1* | 8/2004 | Bedekar | H04L 49/9078 370/235 |
| 2006/0013263 A1* | 1/2006 | Fellman | H04L 65/80 370/503 |
| 2014/0226476 A1 | 8/2014 | Bertze et al. | |
| 2018/0124482 A1 | 5/2018 | Bottari et al. | |
| 2020/0107285 A1* | 4/2020 | Prakash | H04L 1/0018 |

FOREIGN PATENT DOCUMENTS

| | | |
|---|---|---|
| CN | 101946463 A | 1/2011 |
| CN | 107113754 A | 8/2017 |
| WO | 2006/006485 A1 | 1/2006 |

OTHER PUBLICATIONS

3GPP TSG-RAN WG2 Meeting #103bis, Chengdu, China, Oct. 8-12, 2018, R2-1814992, "TSN performance requirements evaluation", Nokia, Nokia Shanghai Bell, 9 pgs.

(Continued)

*Primary Examiner* — Kouroush Mohebbi
(74) *Attorney, Agent, or Firm* — Lippes Mathias LLP

(57) ABSTRACT

It is provided a method, including determining a parameter of a data flow to pass through a non-deterministic network and a buffering device; configuring the data flow in at least one of a network element of the non-deterministic network and the buffering device based on the parameter, wherein the parameter is determined based on a capability of the buffering device.

34 Claims, 9 Drawing Sheets

(56) References Cited

OTHER PUBLICATIONS

3GPP TSG-RAN WG3 Meeting #101bis, Chengdu, China, Oct. 8-12, 2018, R3-185958, "Time Sensitive Networking", Nokia, Nokia Shanghai Bell, 10 pgs.

SA WG2 Meeting #128-Bix, Aug. 20-24, 2018, Sophia Antipolis, S2-188459, "Integration of the 5G System in a TSN network", Nokia, Nokia Shanghai Bell, 7 pgs.

SA WG2 Meeting #129, Oct. 15-19, 2018, Dongguan, China, S2-1810436, "TSN—QoS Framework", Nokia, Nokia Shanghai Bell, 9 pgs.

"New SID: 5GS Enhanced support of Vertical and LAN Services", TSG SA Meeting #SP-80, SP-180507, Agenda: 19, SA WG2, Jun. 13-15, 2018, 4 pages.

"IEEE 802.1", Wikipedia, Retrieved on Jan. 29, 2024, Webpage available at : https://en.wikipedia.org/wiki/IEEE_802.1.

Waqar et al., "A Transport Scheme for Reducing Delays and Jitter in Ethernet-Based 5G Fronthaul Networks", IEEE Access, vol. 6, Aug. 9, 2018, pp. 46110-46121.

Nasrallah et al., "Ultra-Low Latency (ULL) Networks: The IEEE TSN and IETF DetNet Standards and Related 5G ULL Research", arXiv, Sep. 24, 2018, pp. 1-59.

International Search Report and Written Opinion received for corresponding Patent Cooperation Treaty Application No. PCT/EP2018/081765, dated Jul. 11, 2019, 16 pages.

Office action received for corresponding European Patent Application No. 18804617.1, dated Feb. 20, 2023, 3 pages.

"3rd Generation Partnership Project; Technical Specification Group Services and System Aspects; Study on enhancement of 5G System (5GS) for vertical and Local Area Network (LAN) services (Release 16)", 3GPP TR 23.734, V16.2.0, Jun. 2019, pp. 1-117.

Office action received for corresponding Chinese Patent Application No. 201880100635.5, dated Dec. 20, 2023, 11 pages of office action and no page of translation available.

Shan et al., "A Deterministic QoS Guaranteeing Approach for Data Stream Processing", Journal of Software, vol. 19, No. 8, Aug. 2008, pp. 2066-2079.

* cited by examiner

SIGNALLING OF DEJITTERING BUFFER CAPABILITIES FOR TSN INTEGRATION

CROSS REFERENCE TO RELATED APPLICATION

This patent application is a U.S. National Stage application of International Patent Application Number PCT/EP2018/081765 filed Nov. 19, 2018, which is hereby incorporated by reference in its entirety.

FIELD OF THE INVENTION

The present invention relates to deterministic traffic supported by a non-deterministic network such as a radio network, in particular a 3GPP network.

ABBREVIATIONS

3GPP 3$^{rd}$ Generation Partnership Project
4G/5G 4$^{th}$/5$^{th}$ Generation
5GS 5G system
AF Application Function
AMF Access and Mobility Management Function
BDP Bridge Delay Parameters
CDF Cumulative distribution function
CN Core Network
CNC Centralized Network Controller
CP Control plane
CUC Centralized User Configuration
D2X Device to anything
DetNet Deterministic network
DJB De-jittering Buffer
DL Downlink
DN Data Network
E2E end-to-end
IETF Internet Engineering Task Force
LTE Long Term Evolution
MN Mobile Network
MT Mobile Terminal
MTC Machine Type Communication
NG Next Generation
NR New Radio (air interface standard of 5G systems)
PCF Policy Control Function
PDN Packet Data Network
QoS Quality of Service
RAN Radio Access Network
SA System Architecture
SMF Session Management Function
SPS Semi-persistent scheduling
TSC Time Sensitive Communications
TSN Time Sensitive Networking
TTI Transmission Time Interval
UDM Unified Data Management
UDR User-Data-Repository
UE User Equipment
UL Uplink
UP User plane
UPF User plane function
URLLC Ultra-Reliable Low Latency Communications

BACKGROUND OF THE INVENTION

3GPP Release 16 is envisioned to offer deterministic networking capabilities. Concretely, it is a goal in Release 16 to support Time Sensitive Communications (TSC) where the 5GS operates according to guaranteed and promised capabilities in terms of absolute time of delivery, latency, and delay variations of the user plane or jitter (see SA study item description, SP-180507). Support for deterministic communications will also facilitate integration and interplay with existing Industrial Ethernet systems, Time Sensitive Networking (TSN) being a main focus in standardization in Release 16. TSN is a set of standards that define mechanisms for the time-sensitive (i.e. deterministic) transmission of data over Ethernet networks. It is under development by the Time-Sensitive Networking task group of the IEEE 802.1 working group.

A TSN network comprises endstations (also known as talkers or listeners) that are inter-connected to each other via one or multiple Ethernet bridges with time-sensitive (deterministic) transmission capabilities. One of the proposals in SA2 standardization group is to have 'black-box' 5GS-TSN integration, where the 5GS acts as a TSN bridge as depicted in FIG. 1.

On the outermost left and right sides of FIG. 1, TSN entities are shown. The TSN endstation A is connected to the remainder of the TSN network (TSN bridge, CNC, CUC, other endstations such as TSN endstation B) via the 3GPP network, an example of which is depicted in the middle of FIG. 1 in the dashed lined box. Between the TSN endstation A and the 3GPP network, a TSN-MT translator client acts as a translator between 3GPP and TSN. Between the remainder of the TSN network and the 3GPP network, a translator for CP and UP provides the translation. Through the translator entities, the 3GPP network is exposed to the TSN entities like a logical TSN bridge.

The role for the 5GS-TSN is to deliver data at a specific time window (not too early, not too late) to the next hop (TSN bridge, or endstation), given that the data arrives at the ingress within another distinct time-window. This is shown in FIG. 2. According to FIG. 2, a data packet arriving in the ingress time window has to leave the logical TSN bridge (i.e., the 3GPP network) at the egress time window.

The 5GS needs to comply with E2E strict latency and jitter, all the way from the N6 interface (between UPF and the connected DN) to the N60 interface between UE and TSN end device (for downlink direction) and vice versa for uplink. N60 is a proposed term in 3GPP Release 16 to denote the interface between UE and TSN end-device although not yet standardized. The time windows are typically calculated in advance by a Centralized Network Controller (CNC) and communicated to each of the relevant nodes in the network. These per-hop scheduling decisions are based on a-priori collected knowledge of the underlying network topology as well as the performance and functional capabilities of each network node.

SUMMARY OF THE INVENTION

It is an object of the present invention to improve the prior art.

According to a first aspect of the invention, there is provided an apparatus, comprising means for determining configured to determine a parameter of a data flow to pass through a non-deterministic network and a buffering device; means for configuring configured to configure the data flow in at least one of a network element of the non-deterministic network and the buffering device based on the parameter, wherein the means for determining is configured to determine the parameter based on a capability of the buffering device.

According to a second aspect of the invention, there is provided an apparatus, comprising means for determining configured to determine an egress time window of a received data packet; means for buffering configured to buffer the data packet by a buffering device until an egress time within the egress time window; means for providing configured to provide the data packet for transmission at the egress time; means for informing configured to inform a control device on a capability of the buffering device.

According to a third aspect of the invention, there is provided a method, comprising determining a parameter of a data flow to pass through a non-deterministic network and a buffering device; configuring the data flow in at least one of a network element of the non-deterministic network and the buffering device based on the parameter, wherein the parameter is determined based on a capability of the buffering device.

According to a fourth aspect of the invention, there is provided a method, comprising determining an egress time window of a received data packet; buffering the data packet by a buffering device until an egress time within the egress time window; providing the data packet for transmission at the egress time; informing a control device on a capability of the buffering device.

Each of the methods of the third and fourth aspects may be a method of TSN integration.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some example embodiments of the invention, at least one of the following advantages may be achieved:
- compliance with the strict deterministic delivery of data flow (e.g. in TSN/TSC);
- it is avoided that unnecessarily pessimistic indications of network's capability are exposed to TSN/TSC network;
- limitations to TSN/TSC traffic (e.g. number of applications) are calculated more precisely.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Figure 1:
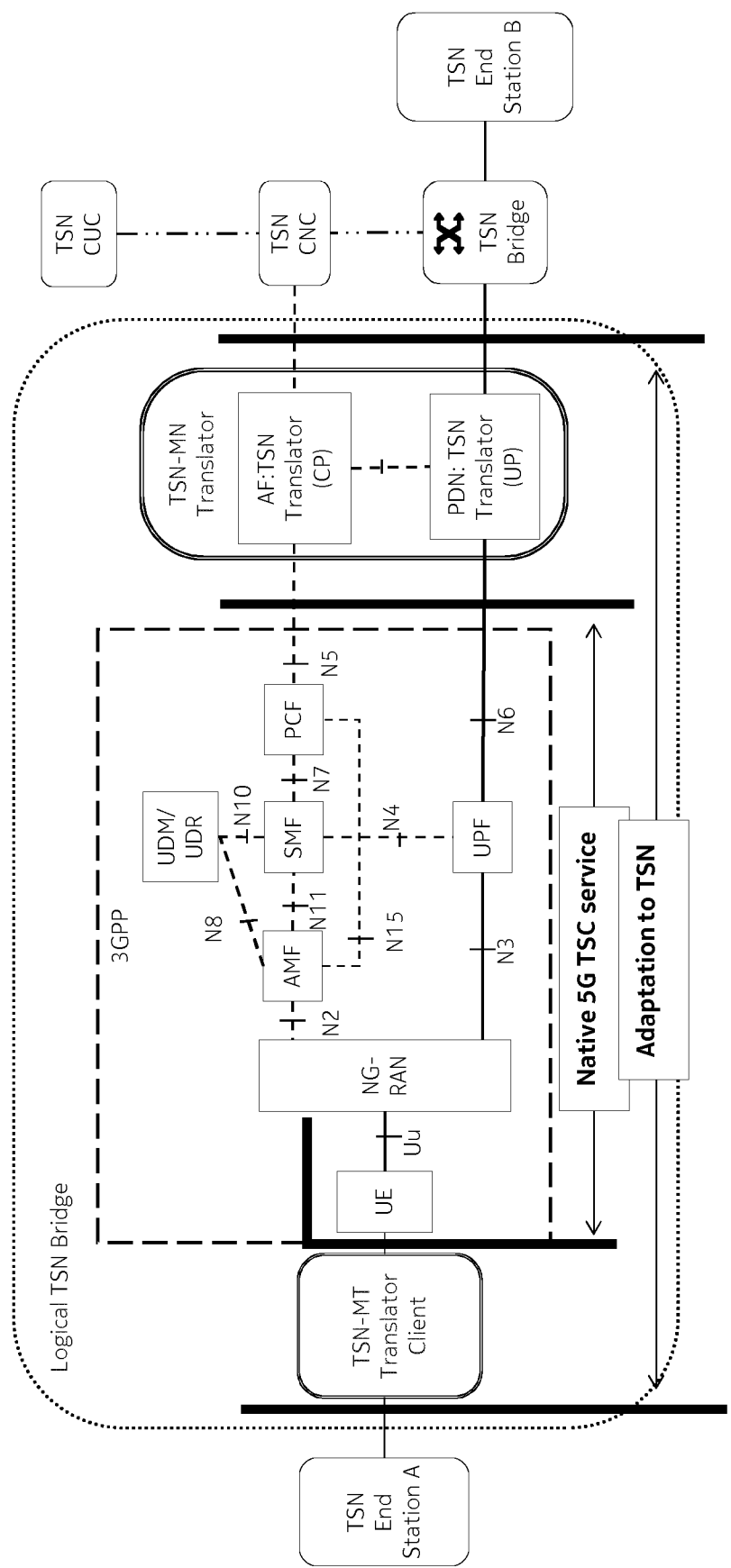
FIG. 1 depicts a TSN network architecture with transparent integration of the 5G system according to the bridge model.
Figure 2:
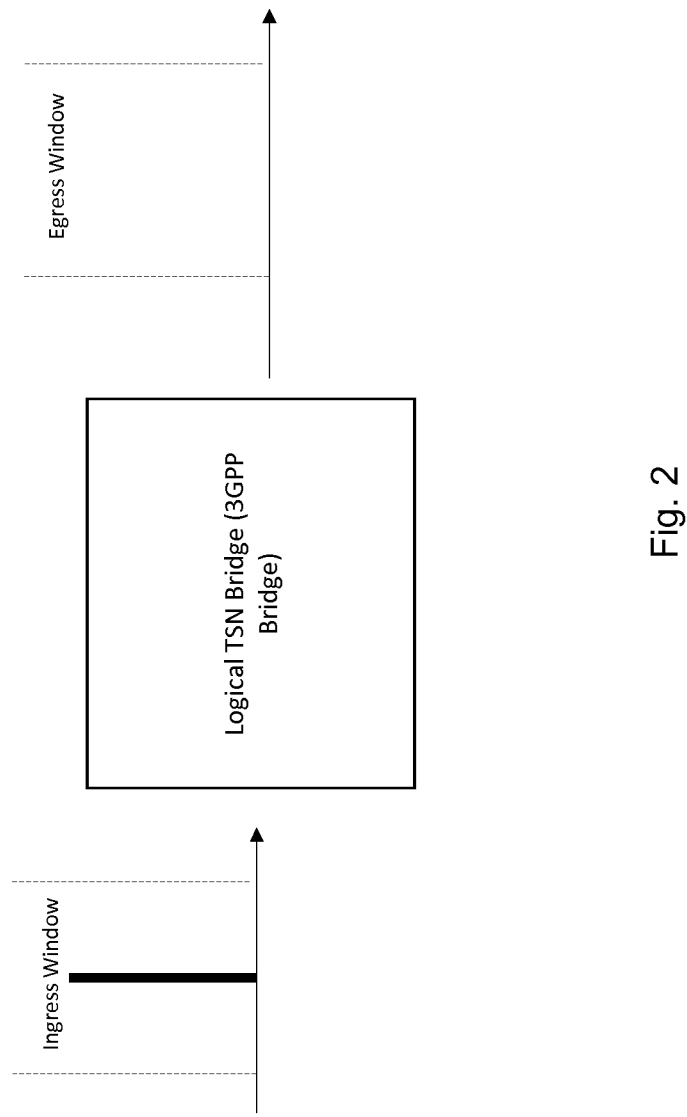
FIG. 2 depicts an example of ingress and egress time windows in time sensitice communication.

The current 5GS QoS framework allows to specify a latency deadline for the packets associated to a certain QoS flow, whereas for full compliance with the TSN requirements, the system needs a way to guarantee also that a packet is not delivered too early (e.g. before the time window that is defined on the egress/output side). The minimum delay can be made inherently within the 3GPP network (e.g. ensure minimum delay within the traditional QoS model and can be embedded in UPF and RAN functions such as the packet scheduler), e.g. within the 3GPP box shown in FIG. 1. Alternatively, the delay can be handled on the outside by a hold-and-forward mechanism, typically referred to as a de-jittering buffer (DJB). Such a function can be standardized for inclusion in the 3GPP UE and UPF mechanisms or can be assumed to be outside of standardization (e.g. could be part of the translator components in FIG. 1). Some example embodiments of the invention apply to any of these cases.

The time-schedules for TSN are extremely short. E.g., 5G TSN is specified to be able to support messages with periodicities down to 0.5 ms and transmission window lengths of only few µs (note that TSN is originally designed for Ethernet networks which use high-speed Ethernet links between nodes). In contrast, the time resolution of the 5GS is typically much higher—around 100 µs or more depending on the transmission time interval (TTI) duration used in the air interface, among other things. Therefore, adding a minimum delivery time as an additional attribute in the 5GS QoS flows may not be sufficient to ensure timely delivery of data, and thus some hold-and-forward mechanisms (or de-jittering buffer (DJB)) will still be useful to adapt to the strict time window resolutions of high speed Ethernet networking in e.g. TSN (microsecond range).

Figure 3:
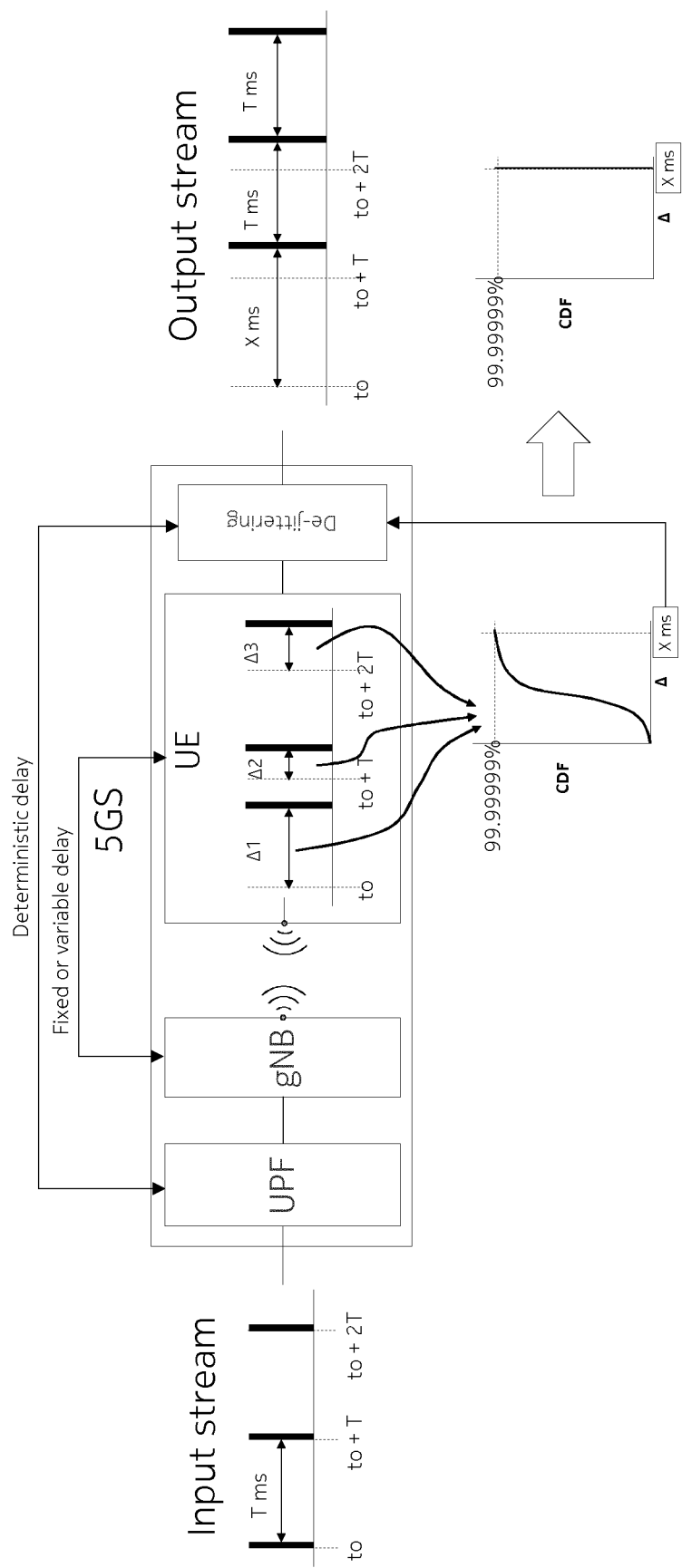
FIG. 3 depicts an example how to achieve deterministic communications in the 5GS in downlink.

The principle of holding and forwarding packets to reduce jitter is illustrated in FIG. 3. A downlink TSN flow enters the 5G system (via the UPF, shown on the left side in FIG. 3) and is scheduled on the air interface e.g. using the URLLC framework to guarantee a maximum latency "X" with 99.9999% probability, indicated by the CDF curve below the UE). This CDF curve indicates the cumulative distribution function of plural packets of the input stream output by the UE without dejittering and spreads over several 100 μs because the 5GS cannot guarantee a minimum latency with the required time resolution. I.e, the packets have some random delay Δ1, Δ2, Δ3, . . . . To comply with the jitter requirements, a de-jittering buffer could be placed on the egress of the UE to hold packets for a certain time and deliver them at the specific time specified for the TSN flow, i.e. t0+n*T+X, wherein X is a fixed delay. Thus, CDF is squeezed into a sharp line, as shown by the CDF curve below the output stream.

Note that in FIG. 3, for simplicity the packet is shown to be delivered at a specific time instant t0+nT for n=1, 2, 3, i.e., window size is equal to the packet size. In this example, the output stream has a fixed delay of X ms for each packet and a period of T ms. In general, it may be sufficient to deliver the packet within a time window. Similar principles can be applied for the uplink assuming a de-jittering buffer is deployed on the output of the UPF instead of the output of the UE.

The deployment of such DJB functionality close to or fully integrated with the 5GS introduces various challenges so far not addressed. For instance, the DJB will have some inherent delay or processing time that should be taken into account when parametrizing the QoS flows in the 5GS. Also, the DJB has some memory limitations meaning that it may only support a limited number of simultaneous data streams and/or is able to hold data for a limited period of time only. Some example embodiments of the invention address these challenges.

Some example embodiments of the invention enable control-plane (CP) signalling between the 5G system and the de-jittering buffer (DJB) that allows the 5GS to be aware of at least one of the DJB's capabilities e.g. in terms processing delays and memory limitations and to perform certain actions/decisions based on the received information on the at least one of the DJB's capabilities.

One of the key challenges of integrating 5GS with an industrial TSN network is in exposing the capabilities of the 3GPP network to the TSN network and establishing appropriate sessions/flows to guarantee the exposed capabilities. Three entities play significant role in this regard, namely (see FIG. 4):

1. De-Jittering Buffer (DJB) capabilities namely, processing times and memory
2. Bridge Delay Parameters (BDP) namely, minimum and maximum "packet length independent delay" and minimum and maximum "packet length dependent delay"
3. The attributes of the QoS flows established in 5G network namely, packet delay budget, which specifies the maximum delay that a packet can incur between the UE and the UPF that terminates the N6 interface in uplink (or between UPF and the UE terminating the N60 interface in downlink).

BDP may be exposed to the TSN network (CUC, CNC).

Figure 4:
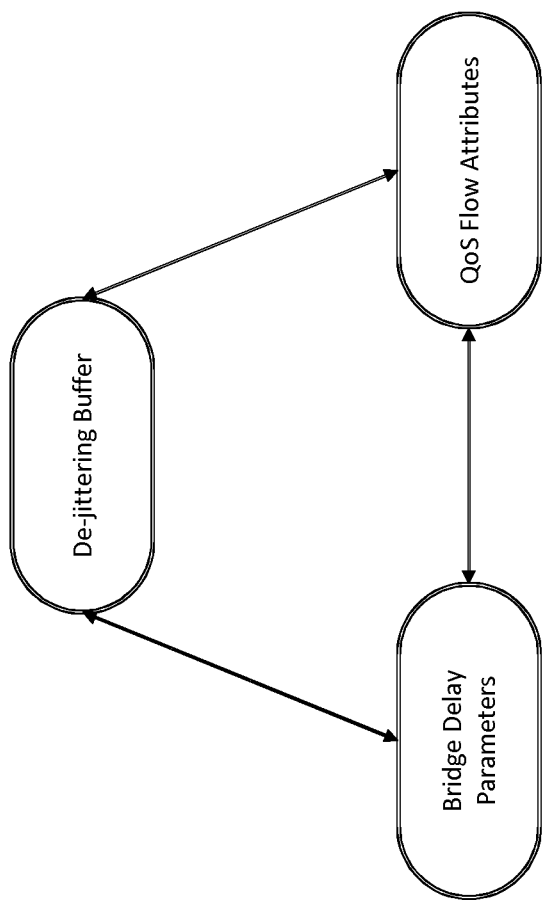
FIG. 4 illustrates the influence of de-jittering buffer on exposed bridge delay parameters and configured QoS flow attributes.

Note that the DJB may terminate single or multiple deterministic or TSN flows. On the UE side, it may be often the case that a single TSN flow is terminated (but multiple flows are also possible). On the UPF side, it is expected that commonly multiple TSN flows may be terminated through the DJB. FIG. 4 shows on high level, that the DJB, BDP and the QoS flow attributes are inter-related. In the following, it is shown by some examples how these three components influence each other:

If the DJB is very large (has a very large memory), then it can accommodate a large number of packets of multiple streams which arrive earlier before the start of their respective egress time window. In this case, either the BDP can be pessimistically reported (min and max of Bridge delay), or the QoS flow can be configured with high quality so that the packets arrive faster than needed which helps reducing the jitter of the 5G bridge reported to the TSN network.

If the DJB is very small (has a very small memory), then it can accommodate only very few packets in the buffer. This means, the difference between the reported min and max values of BDP should be very small. Furthermore, the QoS flows should be configured with the corresponding min and max delay that the flow guarantees. In SA2 Oct. 2018 meeting, it was agreed to introduce a Delay min parameter in 5GS QoS framework. This requires some kind of buffering inherently performed in 5GS either within the DJB or outside DJB if DJB is not part of 3GPP network. In this case, there is a tradeoff between the buffer size needed within 3GPP network to guarantee the Delay min of QoS framework and the DJB size.

Figure 5:
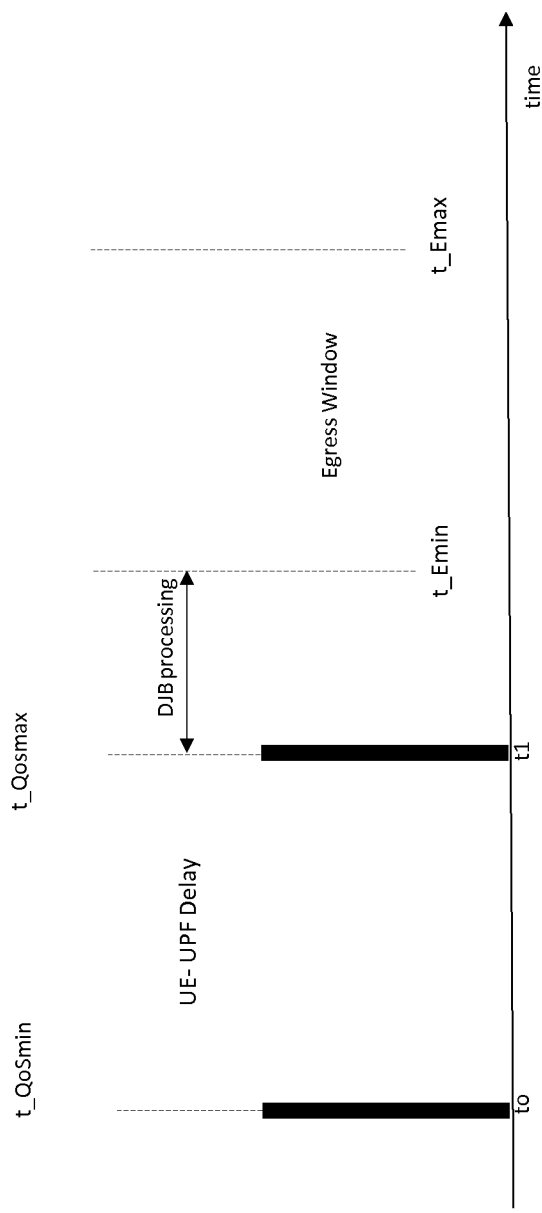
FIG. 5 illustrates a best case scenario, i.e. just in time arrival of packets at the DJB.

In the best case, where the DJB, QoS and BDP are properly chosen, the sum of the delay incurred within the 3GPP network (guaranteed by QoS flow) and the DJB results in the packet arriving at the start of the egress window. FIG. 5 shows an example where the packet arrives just in time at t1 so that the DJB has time till t_Emin to process the packet and can deliver the packet already at the beginning of the Egress window. Making the packet available at the start of the egress window is favourable because it enables the multiplexing of multiple stream packet within overlapping time windows if such a scenario is planned by CNC.

Figure 6:
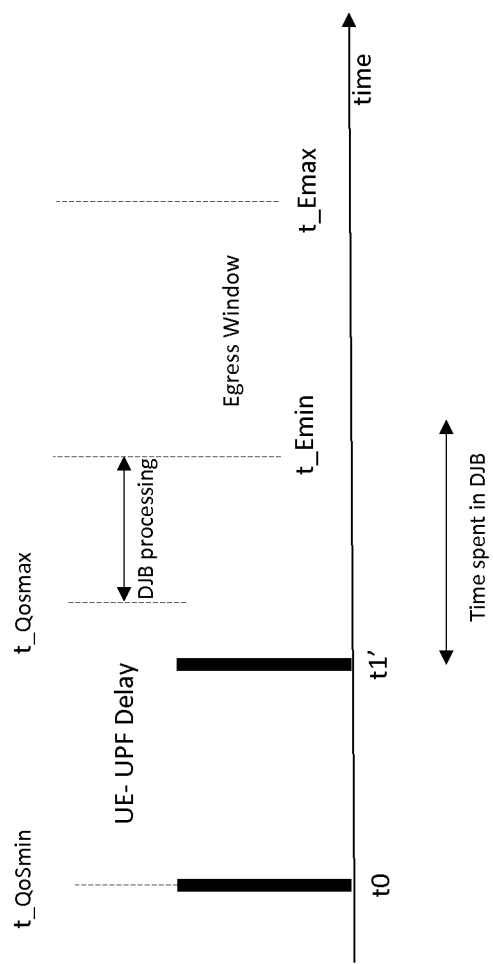
FIG. 6 illustrates an example where a packet is stored (buffered) in DJB before being delivered to the egress port.

FIG. 6 shows an example where the packet is delivered to DJB by the 3GPP network at time t1' within the promised time interval t_QoSmin and t_QoSmax. Here, the packet needs to be stored in the DJB in order wait for the Egress window to be opened. This also enables the just in time delivery of the packets at the start of the egress window.

Furthermore, one may configure t_QoSmax such that the packet delivery at the start of the egress window is not guaranteed (e.g. when the packet arrives at t_QoSmax, and t_QoSmax+DJB processing delay>t_Emin). This configuration exploits the egress time window available for configuring a relaxed QoS requirements at the PCF. In general, one can combine the DJB and the output filtering like output gating, cyclic queue forwarding defined in TSN for an egress port and implement them jointly to have synergetic gains.

In some example embodiments of the invention, the QoS flow attributes are dynamically configured based on the buffer size. This enables better utilization of the 5GS resources and simultaneously, guarantees the BDP promised to the TSN network.

Figure 7:
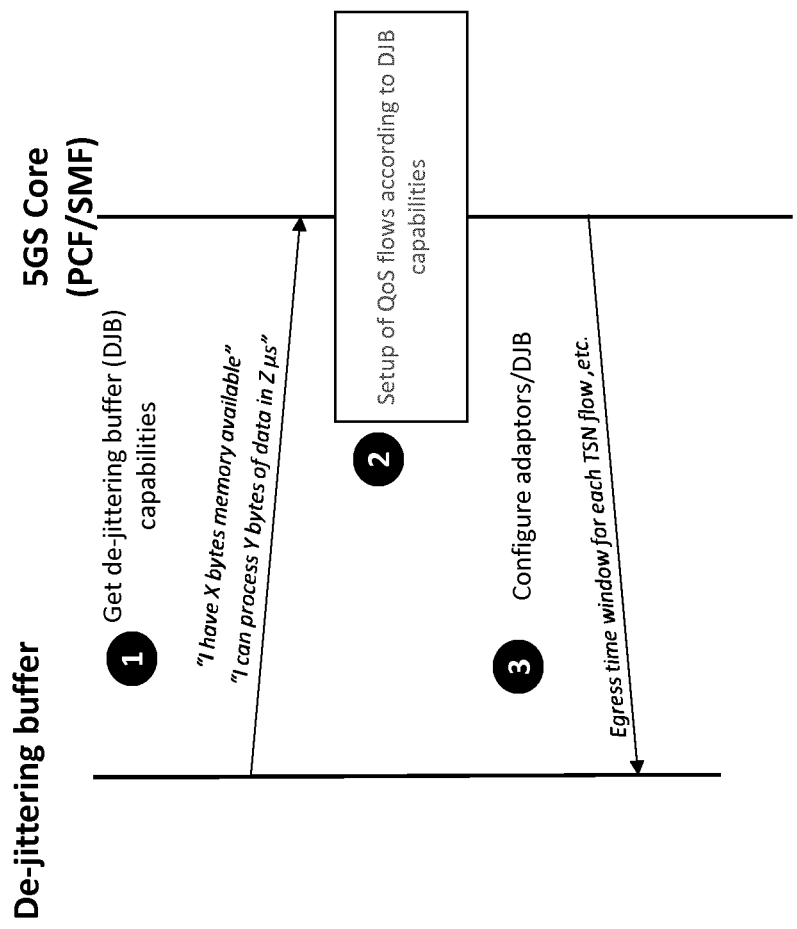
FIG. 7 shows a signalling chart according to some example embodiments of the invention.

FIG. 7 shows a signalling chart according to some example embodiments of the invention. As shown in FIG. 7, the DJB communicates its capability to the 3GPP network, represented e.g. by PCF or SMF. The communication of the capability may be performed by signaling (details on this are presented below). The capability comprises for instance:

How much memory is available at the DJB.

The processing time of the DJB.

The capability may be indicated per UE category. I.e., UEs may be categorized by a special UE category descriptor for TSN/TSC compliant mobiles, and different DJB capabilities may be assigned to different UE categories. This capability indication per UE category may be of particular importance in downlink direction.

In some embodiments of the invention, the communication of the capability of DJB to the 5GS may be omitted. For example, the DJB capability may be preconfigured (manually configured) in the 5GS. For example, in some cases, it is expected that the same vendor may provide both TSN modems and (at least) a relevant portion of 5GS (e.g. PCF/SMF). In such cases, the capability is known and can be manually configured for each deployment.

According to some example embodiments of the invention, the 5GS configures QoS flows according to DJB capability. In the TSN context (where end-to-end scheduling decisions are carried out externally, and based on 5GS-reported capability), the DJB capability are considered when exposing capabilities of the 5GS+DJB combination (considered as a bridge) to the CNC. The received information on DJB capability influence e.g. the following decisions (configurations) on the 5GS:

Limit the number of data flows that need to be handled by the DJB to account for memory limitations, or configure QoS flows such that the packets are delivered just in time as shown in FIG. 5 or even after the start of the egress window (in the latter case by using the synergies between the egress window and DJB, as explained with respect to FIG. 6);

Adjust scheduler framework in RAN to ensure a minimum delivery delay through the 3GPP network to meet memory capabilities of the DJB (e.g. adjust scheduling metrics according to minimum delay or configure SPS/k-repetition patterns accordingly).

Configure an appropriate maximum time or deadline of the packet delivery to the DJB to account for the DJB's inherent processing delay.

In some example embodiments of the invention, these decisions are made within the PCF functionality (knowing the DJB capability) and signaled to the RAN and core functions of the 3GPP network via the AMF/SMF entities. New signaling messages are needed on these interfaces as well as new functionalities within the RAN and core to be able to handle the new DJB specific configurations. Some other actions, e.g. configuring an appropriate deadline for packet delivery, can be to some extent performed using the existing 5GS QoS framework.

According to some example embodiments of the invention, the configuration based on DJB capability may be made dynamically. That is, depending on the current utilization of the DJB (e.g. percentage of used memory) and the statistics on how early or delayed the packets arrive with respect to the egress time window, the QoS flow sessions can be dynamically adapted. For this purpose, the DJB regularly (periodically) informs an entity either within the 3GPP network (e.g. PCF) or outside e.g. TSN translator about the buffer status, to enable dynamic adaptation of the QoS flows. Such a dynamic QoS flow may be standardized as a part of 5G QoS framework. In addition or alternatively to regular reporting, DJB may report its capability based on certain event such as "buffer status reaches a predefined level or more" or "at least a predefined percentage of the incoming data packets arrives such that they can be transmitted only in the latter half of the egress window".

In some example embodiments of the invention, 5GS configures the DJB, e.g.:

Specifies egress time windows for each of the flows, among other relevant properties of the traffic flow, e.g. payload sizes.

Indicates the amount of memory that should be reserved (if not deducible from the information above).

Specifies ingress windows (among other characteristics) of the incoming data (from the TSN network). This is especially relevant in TSN, where a TSN bridge is expected to filter or discard packets if they do not fulfill the pre-agreed properties.

The network entity within 5GS is flexible, it may be e.g. the translator, or the PCF, or another entity in 5GS.

The ingress and egress windows specified by the 5GS shall be based on the schedule configuration given by the CNC in the TSN network.

In a TSN, the egress windows provided by the CNC need to be implemented at the egress port of the translator. In some example embodiments, the windowing may be performed in two steps: 1. at the output of the DJB, and then 2. at the output of the translator. In this case, the DJB is not part of the translator which actually realize the egress port. Thus, the requirements on the egress window of the DJB may be relaxed.

The communication between the DJB and 3GPP network as required in Steps 1 and 3 of FIG. 7 may be done as follows: In case the DJB is (fully) integrated with the UE, DJB-specific messages are signaled between UE and PCF via new signaling on the interfaces connecting RAN, AMF/SMF and PCF entities (N2, N15, N7 in FIG. 1). If the DJB is deployed as part of the TSN translator client, the DJB capabilities at the UE side may be communicated to the TSN translator at the network side (via a pre-established data session between TSN translator client and TSN translator) and from TSN translator communicated to the PCF via N5 interface.

DJB may be implemented within UE/UPF (as an example). For this purpose, a minDelay parameter shall be introduced in the 3GPP QoS framework. In some example embodiments of the invention, the maxDelay and minDelay parameters shall be derived based on the buffer size and the DJB's processing time. In uplink, the PCF signals the minDelay and maxDelay parameters to UPF. A time stamp shall be added at the UE which will be used as reference by the UPF to derive the delay of the packet. For this purpose, the UE and UPF shall be synchronized to same reference clock (e.g. by GPS). A corresponding principle applies to DL. In case DJB is implemented outside 3GPP (UE/UPF) e.g. in TSN translator, then the translator on the network side and on the device side should implement the time stamping mechanism; e.g. time-stamp packets at the ingress translator which allows to estimate the amount of time packets should be retained on the egress side. In some example embodiments, time-stamping is not used. Instead, the DJB may be configured to only deliver packets of a certain flow in a given time interval, e.g. in the form of [n*t_min, n*t_max]. If packet sequence numbers are not available, the DJB may assume that the packet needs to be delivered on the closest upcoming transmit window.

Figure 9:
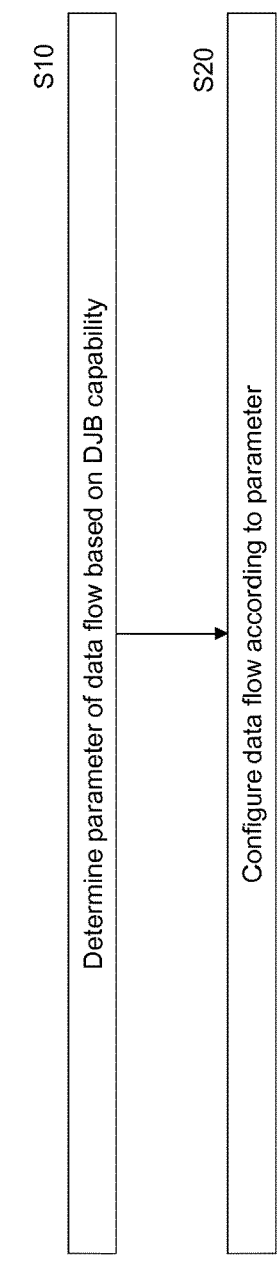
FIG. 9 shows a method according to an example embodiment of the invention.
Figure 8:
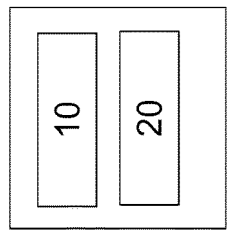
FIG. 8 shows an apparatus according to an example embodiment of the invention.

FIG. 8 shows an apparatus according to an example embodiment of the invention. The apparatus may be a control unit which may be implemented e.g. in a PCF or SMF or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for determining 10 and means for configuring 20. The means for determining 10 and means for configuring 20 may be a determining means and configuring means, respectively. The means for determining 10 and means for configuring 20 may be a determiner and a configurer, respectively. The means for determining 10 and means for configuring 20 may be a determining processor and configuring processor, respectively.

The means for determining 10 determines a parameter of a data flow to pass through a non-deterministic network and a buffering device (S10). The parameter is determined based on a capability of the buffering device.

The means for configuring 20 configures the data flow in at least one of a network element of the non-deterministic network and the buffering device based on the parameter (S20).

Figure 11:
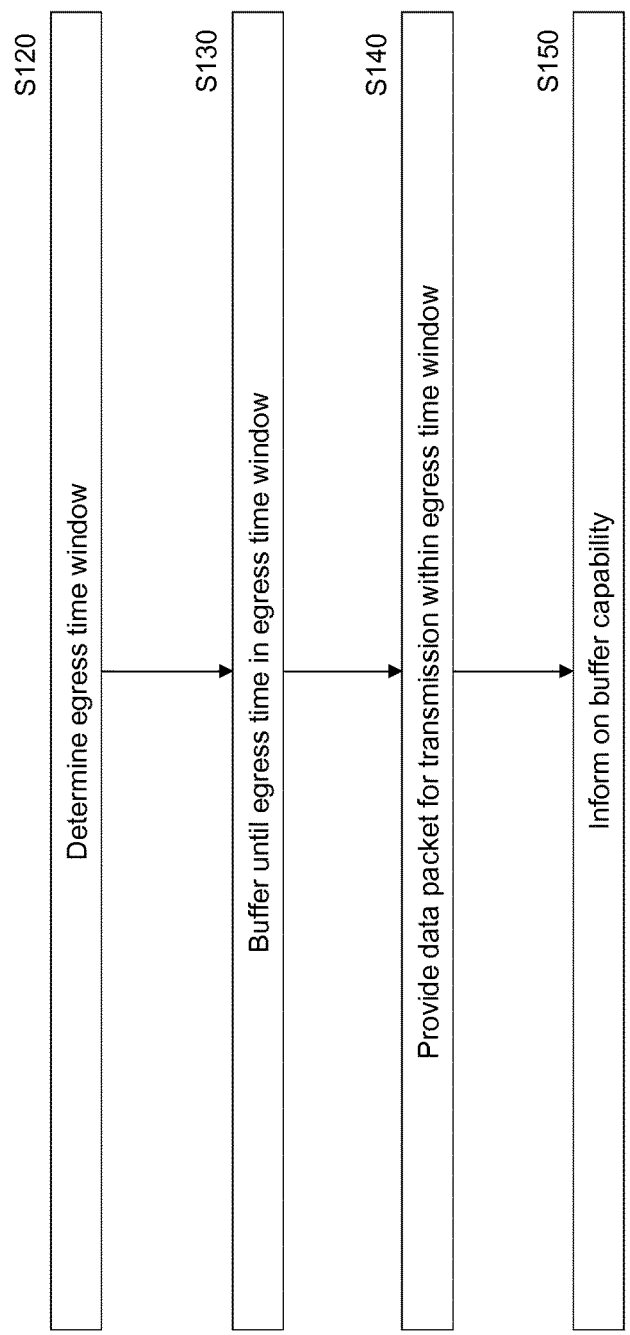
FIG. 11 shows a method according to an example embodiment of the invention.
Figure 10:
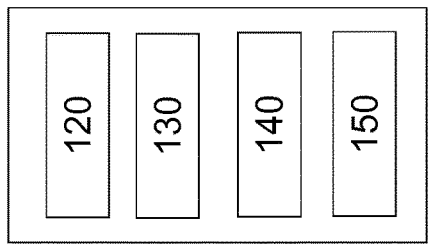
FIG. 10 shows an apparatus according to an example embodiment of the invention.

FIG. 10 shows an apparatus according to an example embodiment of the invention. The apparatus may be a DJB or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for determining 120, means for buffering 130, means for providing 140, and means for informing 150. The means for determining 120, means for buffering 130, means for providing 140, and means for informing 150 may be a determining means, buffering means, providing means, and informing means, respectively. The means for determining 120, means for buffering 130, means for providing 140, and means for informing 150 may be a determiner, buffer, provider, and informer, respectively. The means for determining 120, means for buffering 130, means for providing 140, and means for informing 150 may be a determining processor, buffering processor, providing processor, and informing processor, respectively.

The means for determining 120 determines an egress time window of a received data packet (S120). For example, the means for determining 120 may determine the egress time window based on a time stamp in the received data packet and a predetermined transmission time range. As another example, the means for determining 120 may determine the egress time window based on an identification of the data flow to which the received data packet belongs, and each data flow may be associated with a certain egress time window (e.g. in the form [n*t_min, n*t_max]). In particular if packet sequence numbers are not available (but not limited thereto), the means for determining 120 may assume that the packet needs to be delivered on the closest upcoming transmit window.

The means for buffering 130 buffers the data packet until an egress time within the egress time window (S130). At the egress time, the means for providing 140 provides the data packet for transmission (S140).

The means for informing 150 informs a control device on a capability of the apparatus (S150). In particular, it may inform on a capability of the means for buffering 130.

Figure 12:
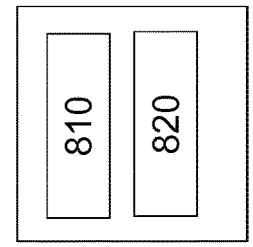
FIG. 12 shows an apparatus according to an example embodiment of the invention.

FIG. 12 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 9 and 11.

Some example embodiments of the invention are described with reference of the 5GS-TSN network integration according to the bridge model. However, the invention is not limited to the bridge model. For example, an alternative black box modelled discussed in 3GPP is a link model where the 5GS-TSN acts as a cable. According to some embodiments of the invention, the 5GS and TSN network are integrated according to the cable model or still another integration model.

Some example embodiments of the invention are described with reference to centralized network configuration, e.g. by CNC. However, the invention is not limited to centralized network configuration. Alternatively, distributed or hybrid TSN configuration methods are possible and also direct interaction with e.g. the Centralized User Configuration (CUC) of IEEE TSN solutions is an option. Some example embodiments of the invention may apply any of these methods or similar principles.

Some example embodiments of the invention are explained with respect to a TSN network.

However, the invention is not limited to TSN networks. Some example embodiments of the invention may be applied to any scenario which requires deterministic communication with a 3GPP network and where there is a need to schedule outgoing traffic at a particular instance of time (or within a certain time window defined by earliest and latest transmission possibility).

Some example embodiments of the invention are described which are based on a 3GPP network (e.g. 5GS). However, the invention is not limited to 5GS. It may be applied to any generation (3G, 4G, 5G, etc.) of 3GPP networks supporting deterministic traffic. However, the invention is not limited to 3GPP networks. It may be applied to other radio networks and fixed networks supporting deterministic traffic.

A UE is an example of a terminal. However, the terminal (UE) may be any device capable to connect to the radio network such as a MTC device, a D2X device etc.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a control entity such as a PCF or SMF, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a buffer entity such as a DJB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus, comprising:
   at least one processor; and
   at least one non-transitory memory storing instructions that, when executed by the at least one processor, cause the apparatus at least to:
   determine a parameter of a data flow to pass through a non-deterministic network and a buffering device;
   configure the data flow in at least one of a network element of the non-deterministic network or the buffering device based on the parameter of the data flow; and
   receive, from the buffering device, signaling of a notification that comprises a capability of the buffering device;
   wherein the parameter is determined based on the capability of the buffering device.

2. The apparatus of claim 1, wherein the parameter is determined at least partially based on the capability of the buffering device defined for a terminal device category of a terminal device involved in the data flow.

3. The apparatus of claim 2, wherein a respective capability of the buffering device is defined for each of plural terminal device categories, and wherein the instructions, when executed by the at least one processor, cause the apparatus at least to:
   get the terminal device category of the terminal device involved in the data flow; and
   retrieve the capability of the buffering device for the gotten terminal device category.

4. The apparatus of claim 1, wherein the instructions, when executed by the at least one processor, cause the apparatus at least to:
   retrieve the capability from a storage device.

5. The apparatus of claim 1, wherein the capability comprises at least one of a memory available to buffer data of the data flow in the buffering device or a processing time per data volume of the data flow to be buffered in the buffering device.

6. The apparatus of claim 1, wherein the parameter comprises at least one of: the egress time window for the data flow, a minimum delay within the non-deterministic network, or a quality of service within the non-deterministic network.

7. The apparatus of claim 1, wherein the instructions, when executed by the at least one processor, cause the apparatus at least to:
   check whether the data flow is configured to carry deterministic traffic; and
   inhibit the determining of the parameter of the data flow when the data flow is not configured to carry deterministic traffic.

8. The apparatus of claim 1, wherein the instructions, when executed by the at least one processor, cause the apparatus at least to:
   hold the data of the data flow for a time period with the network element or the buffering device.

9. The apparatus of claim 1, wherein the instructions, when executed by the at least one processor, cause the apparatus at least to:
   hold the data of the data flow for a time period with the network element or the buffering device prior to an egress time within the egress time window.

10. The apparatus of claim 1, wherein the parameter is determined at least partially based on the capability of the buffering device defined for the terminal device category of the terminal device involved in a downlink direction of the data flow.

11. The apparatus of claim 1, wherein the instructions, when executed by the at least one processor, cause the apparatus at least to:
    configure multiplexing of multiple stream packets with overlapping time windows, based at least partially on the egress time window.

12. The apparatus of claim 11, wherein the multiple stream packets are configured for multiplexing with overlapping time windows based on a configuration of a network controller.

13. The apparatus of claim 1, wherein the apparatus comprises a session management function of a core network.

14. The apparatus of claim 1, wherein the apparatus comprises a policy control function of a core network.

15. An apparatus, comprising:
    at least one processor; and
    at least one non-transitory memory storing instructions that, when executed by the at least one processor, cause the apparatus at least to:
    determine an egress time window of a received data packet;
    buffer the data packet with a buffering device until an egress time within the egress time window;
    provide the data packet for transmission at the egress time; and
    transmit, to a control device, signaling of a notification that comprises a capability of the buffering device;
    wherein the egress time window or the egress time is determined at least partially based on the capability of the buffering device.

16. The apparatus of claim 15, wherein the instructions, when executed by the at least one processor, cause the apparatus at least to:
    retrieve a time stamp out of the received data packet;
    wherein the determining comprises determining the egress time window of the data packet based on the time stamp and a predetermined transmission time range.

17. The apparatus of claim 15, wherein the instructions, when executed by the at least one processor, cause the apparatus at least to:
    identify a data flow to which the data packet belongs;
    wherein the determining comprises determining the egress time window based on the data flow.

18. The apparatus of claim 15, wherein the determining comprises determining a closest upcoming transmit window as the egress time window of the received data packet.

19. The apparatus of claim 15, wherein the capability comprises at least one of a memory available to buffer data in the buffering device or a processing time per data volume to be buffered in the buffering device.

20. The apparatus of claim 15, wherein the control device comprises a session management function of a core network.

21. The apparatus of claim 15, wherein the control device comprises a policy control function of a core network.

22. The apparatus of claim 15, wherein the egress time window or the egress time is determined at least partially based on the capability of the buffering device defined for a terminal device category of a terminal device involved in a data flow associated with the data packet.

23. A method, comprising:
determining a parameter of a data flow to pass through a non-deterministic network and a buffering device;
configuring the data flow in at least one of a network element of the non-deterministic network or the buffering device based on the parameter of the data flow; and
receiving, from the buffering device, signaling of a notification that comprises a capability of the buffering device;
wherein the parameter is determined based on the capability of the buffering device.

24. The method of claim 23, wherein the parameter is determined at least partially based on the capability of the buffering device defined for a terminal device category of a terminal device involved in the data flow.

25. The method of claim 24, wherein a respective capability of the buffering device is defined for each of plural terminal device categories, and the method further comprises:
getting the terminal device category of the terminal device involved in the data flow; and
retrieving the capability of the buffering device for the gotten terminal device category.

26. The method of claim 23, further comprising:
retrieving the capability from a storage device.

27. The method of claim 23, wherein the capability comprises at least one of a memory available to buffer data of the data flow in the buffering device or a processing time per data volume of the data flow to be buffered in the buffering device.

28. The method of claim 23, wherein the parameter comprises at least one of: the egress time window for the data flow, a minimum delay within the non-deterministic network, or a quality of service within the non-deterministic network.

29. The method of claim 23, further comprising:
checking whether the data flow is configured to carry deterministic traffic; and
inhibiting the determining of the parameter of the data flow when the data flow is not configured to carry deterministic traffic.

30. A method, comprising:
determining an egress time window of a received data packet;
buffering the data packet with a buffering device until an egress time within the egress time window;
providing the data packet for transmission at the egress time; and
transmitting, to a control device, signaling of a notification that comprises a capability of the buffering device;
wherein the egress time window or the egress time is determined at least partially based on the capability of the buffering device.

31. The method of claim 30, further comprising:
retrieving a time stamp out of the received data packet;
wherein the egress time window of the data packet is determined based on the time stamp and a predetermined transmission time range.

32. The method of claim 30, further comprising:
identifying a data flow to which the data packet belongs;
wherein the egress time window is determined based on the data flow.

33. The method of claim 30, wherein a closest upcoming transmit window is determined as the egress time window of the received data packet.

34. The method of claim 30, wherein the capability comprises at least one of a memory available to buffer data in the buffering device or a processing time per data volume to be buffered in the buffering device.

* * * * *